United States Patent
Park

(10) Patent No.: US 11,264,016 B2
(45) Date of Patent: Mar. 1, 2022

(54) NOISE MANAGEABLE ELECTRONIC DEVICE AND CONTROL METHOD THEREOF

(71) Applicant: LG Electronics Inc., Seoul (KR)

(72) Inventor: Yun Sik Park, Seoul (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 16/696,373

(22) Filed: Nov. 26, 2019

(65) Prior Publication Data

US 2021/0074283 A1    Mar. 11, 2021

(30) Foreign Application Priority Data

Sep. 6, 2019 (KR) .................. 10-2019-0111007

(51) Int. Cl.
| | | |
|---|---|---|
| *G10L 17/04* | (2013.01) | |
| *G10L 21/02* | (2013.01) | |
| *G10L 21/0208* | (2013.01) | |
| *G06F 3/16* | (2006.01) | |
| *G10L 15/20* | (2006.01) | |
| *G10L 15/22* | (2006.01) | |

(52) U.S. Cl.
CPC .............. *G10L 15/20* (2013.01); *G06F 3/167* (2013.01); *G10L 15/22* (2013.01); *G10L 2015/228* (2013.01)

(58) Field of Classification Search
USPC ................... 382/155–160, 209, 225; 704/10, 704/200–278
See application file for complete search history.

(56) References Cited

U.S. PATENT DOCUMENTS

| 2009/0129610 A1* | 5/2009 | Kim ..................... G10K 11/178 381/94.7 |
| 2010/0070274 A1* | 3/2010 | Cho ........................ G10L 15/20 704/233 |
| 2010/0278352 A1* | 11/2010 | Petit ....................... H04R 3/005 381/71.1 |
| 2016/0019904 A1* | 1/2016 | Charette ................. G10L 25/93 704/227 |

(Continued)

FOREIGN PATENT DOCUMENTS

| KR | 10-0998897 | 12/2010 |
| KR | 10-1506510 | 3/2015 |

*Primary Examiner* — Marcellus J Augustin
(74) *Attorney, Agent, or Firm* — Fish & Richardson P.C.

(57) ABSTRACT

The present disclosure relates to a noise manageable electronic device and a control method thereof as the disclosure capable of operating even in the Internet of Things (IoT) environment through a 5G communication network, and the electronic device of the present disclosure may control the driving of the electronic device that generates noise when a voice command is generated by a user. The present disclosure may be configured to include a receiver configured to receive the voice command from the user and noise generated from a plurality of electronic devices arranged in the home, a noise extractor configured to extract the noise, and a processor configured to determine whether the received voice command is recognizable, and to reduce the noise by controlling driving of a first electronic device that has generated the noise among the plurality of electronic devices, when it is determined that the voice command is not recognizable.

16 Claims, 9 Drawing Sheets

(56) References Cited

U.S. PATENT DOCUMENTS

| | | | |
|---|---|---|---|
| 2017/0025124 A1* | 1/2017 | Mixter | G10L 15/22 |
| 2017/0178627 A1* | 6/2017 | Firby | G10L 25/60 |
| 2017/0358313 A1* | 12/2017 | Shih | G10L 21/0264 |
| 2018/0096690 A1* | 4/2018 | Mixter | G10L 21/0216 |
| 2018/0293988 A1* | 10/2018 | Huang | G10L 17/20 |
| 2021/0056963 A1* | 2/2021 | Lee | G06F 16/68 |

\* cited by examiner

NOISE MANAGEABLE ELECTRONIC DEVICE AND CONTROL METHOD THEREOF

CROSS-REFERENCE TO RELATED APPLICATION

This application claims benefit of priority to Korean Application No. 10-2019-0111007, filed on Sep. 6, 2019, the entire disclosure of which is incorporated herein by reference.

BACKGROUND

1. Technical Field

The present disclosure relates to a noise manageable electronic device and a control method thereof. More specifically, the present disclosure relates to a technology for controlling the driving of an electronic device that generates noise when a voice command has been generated by a user.

2. Description of Related Art

The following description is only for the purpose of providing background information related to embodiments of the present disclosure, and the contents to be described do not necessarily constitute related art.

With the development of technology, various electronic devices (for example, a TV, an audio, a washer, a refrigerator, a dryer, and the like) are spreading in an office and a home. A remote control device (hereinafter referred to as a remote control) is developed and used in most of these electronic devices in order to pursue a better usage convenience of the user. Accordingly, most electronic devices are conveniently controlled and driven remotely by the user through the remote control.

Recently, various services using voice recognition technology have been introduced in many fields with technological developments. A speech recognition technology may be understood as a series of processes of understanding utterances spoken by a speaker and converting the spoken utterance to text data recognizable and usable by computers. Furthermore, the speech recognition services using such a speech recognition technology may include a series of processes for recognizing user's spoken utterance and providing a service appropriate thereto.

In particular, as an example of voice recognition technology, electronic devices in a home and an office may be controlled by the voice command of the user. At this time, the user's voice and noise generated by operating the surrounding electronic devices may be generated together. In this case, the user's voice may not be accurately recognized, and accordingly, a control of the electronic device corresponding to the voice command of the user may not be performed properly.

Accordingly, there is a need for a control of the electronic device to minimize the generated noise of the surroundings and to respond to the voice command of the user. The technology to which such a voice recognition technology has been applied is disclosed by the related art 1 and the related art 2.

Specifically, the 'VOICE RECOGNITION HOME AUTOMATION SYSTEM AND HOME APPLIANCE CONTROL METHOD USING THE SAME' of Korean Patent (related art 1) No. 10-0998897 discloses a technology capable of controlling an electronic device in a home remotely by using control command data converting a voice message of a mobile phone through an external server.

However, the 'VOICE RECOGNITION HOME AUTOMATION SYSTEM AND HOME APPLIANCE CONTROL METHOD USING THE SAME' transmits the voice message for controlling the home appliance by using the mobile phone.

That is, a technology capable of minimizing the generated noise of the surroundings and controlling the electronic device in response to the voice command of the user is not disclosed.

In addition, the 'VOICE RECOGNITION HOME NETWORK SYSTEM' of Korean Patent No. 10-1506510 (related art 2) may disclose a technology capable of controlling all the electronic devices that may be controlled through a remote control and a voice control box with a simple voice command, and allowing an external server or a user to directly update the remote control and the voice control box from time to time.

However, the related art 2 does not disclose a technology capable of minimizing the generated noise of the surroundings and controlling the electronic device in response to the voice command of the user.

Accordingly, there is a need for a technology of controlling the driving of the electronic device that has generated noise among the surrounding electronic devices when the voice command generates, such that the voice command of the user is accurately recognized so that the control of the electronic device in response to the voice command of the user may be properly performed.

The above-described background technology is technical information that the inventors hold for the derivation of the present disclosure or that the inventors acquired in the process of deriving the present disclosure. Thus, the above-described background technology cannot be regarded as known technology disclosed to the general public prior to the filing of the present application.

RELATED ART DOCUMENTS

Patent Documents

Related Art 1: Korean Patent No. 10-0998897 (registered on Dec. 1, 2010)
Related Art 2: Korean Patent No. 10-1506510 (registered on Mar. 23, 2015)

SUMMARY OF THE DISCLOSURE

An object of the present disclosure is to enable a management command recognition function generated from a user to be improved.

In addition, another object of the present disclosure is to determine the electronic device that generates noise among a plurality of electronic devices arranged in a home in response to the voice command generated from the user.

In addition, still another object of the present disclosure is to measure the noise generated from the electronic device, and to control the driving of the electronic device so that the measured noise may be maintained as appropriate noise.

The present disclosure is not limited to solving the above-described problems, and other aspects and advantages of the present disclosure may be appreciated by those skilled in the art based on the following description and will be understood more clearly from embodiments of the present disclosure. It is also to be understood that the aspects of the present disclosure may be realized by means and combinations thereof set forth in claims.

A method of controlling an electronic device in a home for noise management for achieving the objects may be implemented in a process of receiving a voice command from a user and a sound signal including noise generated from a plurality of electronic devices arranged in the home, extracting the noise from the sound signal, then determining whether the voice command is recognizable relative to the received noise, and then reducing the noise by controlling driving of the first electronic device, when determining a first electronic device that has generated the noise among the plurality of electronic devices if it is determined that the voice command is not recognizable.

Specifically, when determining the first electronic device, the method may measure the level (dB) of driving noise generated from the plurality of electronic devices through at least any one of a microphone or a camera arranged in the home, then extract the driving noise having the largest level among the driving noises generated from the plurality of electronic devices, and then determine an electronic device that generates the driving noise having the largest level is determined as the first electronic device.

At this time, when measuring the level (dB) of the driving noise, the method may measure the level of the driving noise of at least any one among wind noise, vibration noise, suction noise, and sound noise generated at operation of the plurality of electronic devices.

In addition, when determining the first electronic device, the method may analyze at least any one among the wind noise, the vibration noise, the suction noise, and the sound noise generated at operation of the electronic device when the voice command is not recognizable.

In the method of controlling the electronic device of the present disclosure, when determining whether the voice command is recognizable, the method may determine a ratio between the voice command and the noise based on a signal-to-noise ratio (SNR), and analyze the determined ratio between the voice command and the noise.

Specifically, after analyzing the ratio, it is determined that the voice command is not recognizable as the rate of the noise is larger than the voice command in the signal-to-noise ratio (SNR).

In addition, after determining whether the voice command is recognizable, it is not possible to determine the first electronic device among the plurality of electronic devices.

Specifically, when it is determined that it is not possible to determine the first electronic device, the method may control the driving of any one electronic device among the plurality of electronic devices, measure the level of the driving noise generated from the plurality of electronic devices except for the any one electronic device through at least any one of a microphone or a camera arranged in the home, and then extract the driving noise having the largest level among the driving noises generated from the plurality of electronic devices based on the measured level.

At this time, an electronic device that generates the driving noise having the largest level is determined as the first electronic device.

In addition, before receiving the voice command from the user, the method may input learning data that receives a learning data set labeled with driving noise generated for each driving operation of the plurality of electronic devices, at operation of the plurality of electronic devices, train a machine learning model for determining of the driving noise of the plurality of electronic devices generated while the plurality of electronic devices are driven based on the learning data set, and then store the machine learning model generated in the training as a driving noise determination program of the plurality of electronic devices.

Meanwhile, a noise manageable electronic device in a home according to an embodiment of the present disclosure may include a receiver configured to receive a voice command from a user and a sound signal including noise generated from a plurality of electronic devices arranged in the home, a noise extractor configured to extract the noise from the sound signal, and a processor configured to determine whether the received voice command is recognizable, and to reduce the noise by controlling driving of a first electronic device that has generated the noise among the plurality of electronic devices, when it is determined that the voice command is not recognizable.

Specifically, the processor may include, when it is determined that the voice command is not recognizable, a level measurer configured to measure the level (dB) of driving noise generated from the plurality of electronic devices through at least any one of a microphone or a camera arranged in the home and a noise extractor configured to extract the driving noise having the largest level among the driving noises generated from the plurality of electronic devices, and an electronic device that generates the driving noise having the largest level may be determined as a first electronic device.

At this time, the level measurer may measure the level of the driving noise of at least any one among wind noise, vibration noise, suction noise, and sound noise generated at operation of the plurality of electronic devices.

In addition, the processor may further include an analyzer configured to determine a ratio between the voice command and the noise based on a signal-to-noise ratio (SNR), and to analyze the determined ratio between the voice command and the noise.

At this time, the analyzer may analyze at least any one among the wind noise, the vibration noise, the suction noise, and the sound noise generated at operation of the plurality of the electronic devices when the voice command is not recognizable.

That is, the analyzer determines that the voice command is not recognizable as the rate of the noise is larger than the voice command in the signal-to-noise ratio (SNR).

Meanwhile, the processor may determine whether the first electronic device among the plurality of electronic devices may not be determined.

Here, when it is determined that the first electronic device among the plurality of electronic devices may not be determined, the processor may control driving of any one electronic device among the plurality of electronic devices, and determine an electronic device that generates driving noise having the largest level as the first electronic device, after measuring the level of the driving noise generated from the plurality of electronic devices except for the any one electronic device through the level measurer to extract the driving noise having the largest level among the driving noises generated from the plurality of electronic devices based on the measured level.

In addition, the processor may further include a memory configured to train a machine learning model for determining of the driving noises of the plurality of electronic devices generated at operation of the plurality of electronic devices based on a learning data set labeled with the driving noise generated for each driving operation of the plurality of electronic devices, when the plurality of electronic devices are driven, and to store the machine learning model generated by the training as a driving noise determination program of the plurality of electronic devices.

Meanwhile, a noise manageable electronic device in a home of the present disclosure includes one or more processors and a memory connected to the processor.

At this time, when executed by the one or more processors, the memory may store a command causing so that the processor receives a voice command from a user and a sound signal including noise generated from a plurality of electronic devices arranged in the home, extracts the noise from the sound signal, determines whether the received voice command is recognizable, and reduces the noise by controlling driving of a first electronic device that has generated the noise among the plurality of electronic devices, when it is determined that the voice command is not recognizable.

In addition, according to the present disclosure, it is receiving, by a receiver, sound that comprises a voice command from a user and noise generated from at least one of a plurality of electronic devices, extracting, out of the received sound by a noise extractor, at least a portion of the noise generated from at least one of the plurality of electronic devices, determining, by a processor, whether the received voice command is recognizable relative to the received noise after extraction, determining, by the processor, a first electronic device of the plurality of electronic devices that is responsible for at least a portion of the noise based on a determination that the voice command is non-recognizable and reducing the noise by controlling the first electronic device.

Meanwhile, according to an electronic device configured to control noise, a receiver configured to receive sound that comprises a voice command from a user and noise generated from at least one of a plurality of electronic devices, a noise extractor configured to extract, out of the received sound, at least a portion of the noise generated from at least one of the plurality of electronic devices, and a processor configured to determine whether the received voice command is recognizable relative to the received noise after extraction and reduce the noise by controlling a first electronic device of the plurality of electronic devices, wherein the first electronic device that is responsible for at least a portion of the noise is determined based on a determination that the voice command is non-recognizable.

In addition, according to a noise manageable electronic device, one or more processors and a memory connected to the processor.

Specifically, the one or more processors are configured to execute commands stored in the memory to, receive sound that comprises a voice command from a user and noise generated from at least one of a plurality of electronic devices, extract at least a portion of the noise generated from at least one of the plurality of electronic devices and determine whether the received voice command is recognizable relative to the received noise after extraction, and reduce the noise by controlling a first electronic device of the at least one of the plurality of electronic devices, and the first electronic device is determined based on a determination that the voice command is non-recognizable.

Other aspects and features than those described above will become apparent from the following drawings, claims, and detailed description of the present disclosure.

According to the present disclosure, it is possible to determine the first electronic device having generated noise when the voice command generated from the user is recognized, if it is determined that the voice command generated through the voice command generated by the user is not recognizable in the state where the electronic device has learned the information on the type, size, and the like of the noise generated when the electronic device is driven. At this time, it is possible to determine the ratio of the noise to the voice command in the signal-to-noise ratio to determine the first electronic device having the largest noise. Accordingly, it is possible to minimize the inconvenience of the user caused by the noise.

In addition, when the voice command is generated from the user, and it is difficult to determine the first electronic device, that generates the noise at the appropriate noise or more, among the plurality of electronic devices, an embodiment of the present disclosure may control the driving of any one electronic device among the plurality of electronic devices, and then control the driving of another electronic device except for the any one controlled electronic device when the noise level is measured and the appropriate noise or more is measured, thereby blocking the source of the noise. Accordingly, it is possible to block the noise generated from the home, thereby minimizing the inconvenience due to the noise.

The effects of the present disclosure are not limited to those mentioned above, and other effects not mentioned may be clearly understood by those skilled in the art from the following description.

DETAILED DESCRIPTION

Figure 1:
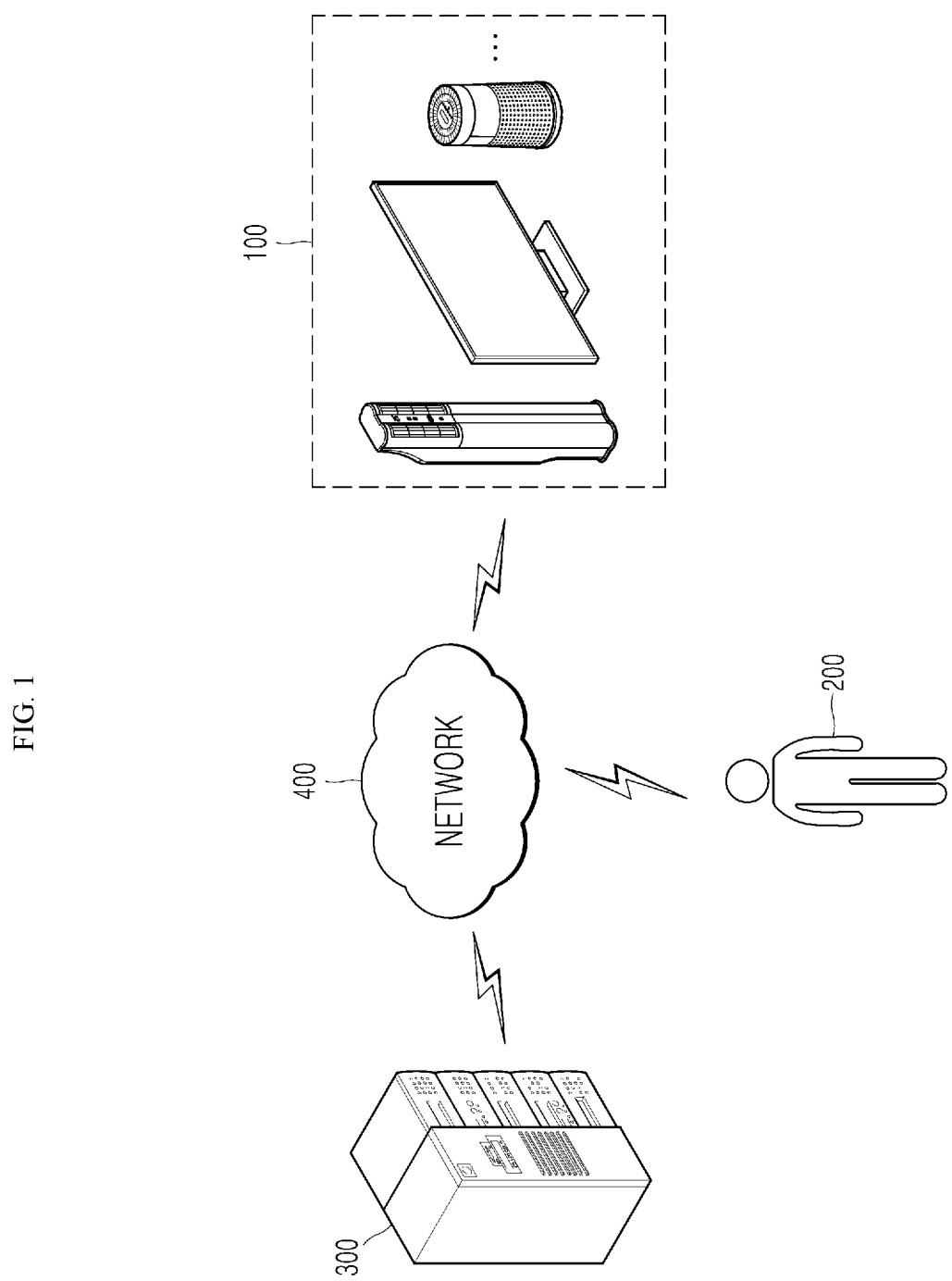
FIG. 1 is a diagram showing a noise manageable electronic device including an electronic device to which the noise manageable electronic device according to an embodiment of the present disclosure has been applied, a server, a user, and a network for connecting them to each other.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted. However, in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Hereinafter, when the user of the present disclosure has uttered a voice command, a noise manageable electronic device capable of controlling the driving of the electronic device that generates noise will be described in detail with reference to the drawings.

Figure 2:
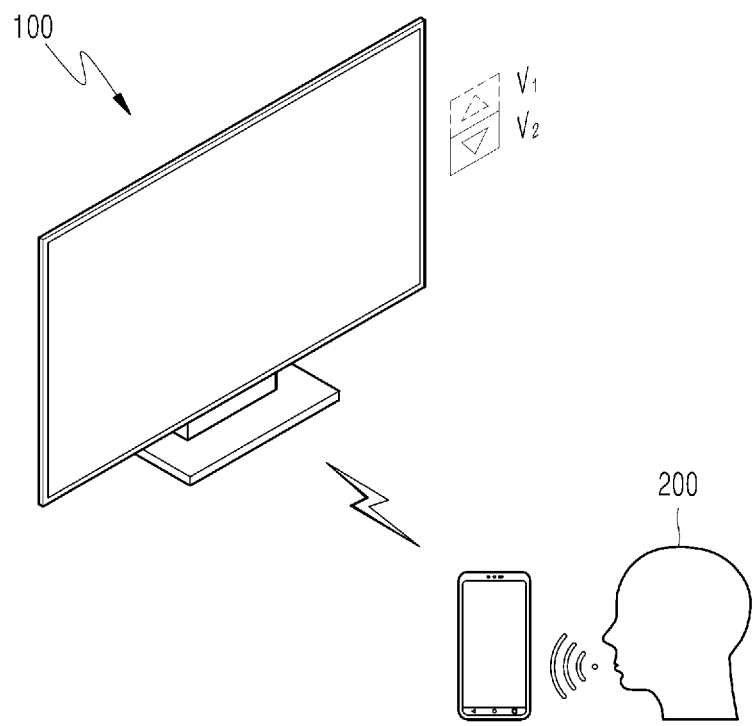
FIG. 2 is a diagram for explaining a driving control embodiment of a noise manageable electronic device according to an embodiment of the present disclosure.

FIG. 1 is a diagram showing a noise manageable electronic device including an electronic device to which the noise manageable electronic device according to an embodiment of the present disclosure has been applied, a server, a user, and a network for connecting them to each other, and FIG. 2 is a diagram for explaining a driving control embodiment of a noise manageable electronic device according to an embodiment of the present disclosure.

The noise manageable electronic device according to an embodiment of the present disclosure may communicate with an artificial intelligence speaker and a server 300 installed in a home (for example, a home, an office, or the like) through a communication network.

Hereinafter, as an example that a noise manageable electronic device has been disposed in a home, an IoT environment may be implemented through 5G communication in a home where a noise manageable electronic device has been disposed to be configured so that various electronic devices may communicate with each other.

A server 300 may determine a voice command of the user, noise generated from a home, an electronic device that generates noise, and the like through a microphone, a camera, and the like mounted in the electronic device. A processor 180 of the electronic device may be controlled to control the driving of the electronic device (hereinafter, referred to as a first electronic device 100*a* (see FIGS. 2 and 5) where the noise thus determined generates. That is, after the voice command of the user is generated, the control of the electronic device that has generated the noise may be performed by the server 300.

The network 400 may serve to connect the server 300 with the noise manageable electronic device. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples.

The network 400 may also send and receive information using short distance communication and/or long distance communication. Here, the short distance communication may include Bluetooth, radio frequency identification (RFID), infrared data association (IrDA), ultra-wideband (UWB), ZigBee, or wireless fidelity (Wi-Fi) technology, and the long distance communication may include code division multiple access (CDMA), frequency division multiple access (FDMA), time division multiple access (TDMA), orthogonal frequency division multiple access (OFDMA), or single carrier frequency division multiple access (SC-FDMA) technology.

The network 400 may include a connection of network elements such as a hub, a bridge, a router, a switch, and a gateway. The network 400 may include one or more connected networks, for example, a multi-network environment, including a public network such as an internet and a private network such as a safe corporate private network. The access to the network 400 may be provided via one or more wired or wireless access networks. Further, the network 400 may support 5G communication and/or an Internet of things (IoT) network for exchanging and processing information between distributed components such as objects.

The electronic device may also receive a voice command of the user 200 that is instructed by voice through a camera, a microphone, etc. arranged in the home, or on the contrary, may also transmit the driving state of the electronic device to an artificial intelligence speaker to notify the user by voice. In addition, the electronic device may be mounted with the artificial intelligence speaker that recognizes voice to directly receive the voice command of the user or notify the user 200 of a signal generated in the electronic device through the mounted artificial intelligence speaker.

Meanwhile, in an embodiment of the present disclosure, an example of transmitting and receiving the voice command of the user 200 by voice is described, but alternatively, it is natural that the user 200 may transmit and receive the voice command through a display, a confirmation button, or the like for confirming the noise management installed in the electronic device.

In addition, the electronic device may receive the user's instruction through the user's terminal (for example, a personal mobile terminal, a tablet, a wearable device, or the like), and on the contrary, also transmit a signal generated from the electronic device to the user terminal.

The electronic device may be any one of various electronic devices such as an air conditioner, a refrigerator, a TV, and a washer installed in a home, and the present disclosure is not limited by the type of the electronic device.

In particular, noise such as driving vibration may generate while the electronic device is driven. At this time, the driving of the electronic device may be controlled to reduce the noise generated from the electronic device according to the voice command of the user.

As shown in FIG. 2, the driving control of the electronic device may be set by controlling the driving of the electronic device that largely generates noise among the electronic devices in operation, when the user proceeds with a call or when the user generates a voice command saying "noisy" or "reduce the sound."

For example, the TV may include an artificial intelligence speaker capable of receiving the voice command of the user. The volume adjustment operation of the TV may be controlled according to the user's voice received by the artificial intelligence speaker.

Specifically, the user may make a call with the personal mobile terminal in a state where the TV is on. The call voice of the user may be received from the artificial intelligence speaker of the TV, and the volume of the TV may be set to automatically reduce when the call voice of the user is received from the artificial intelligence speaker of the TV.

If the user proceeds with the call by using the personal mobile terminal in a state where the TV is on, the user may have difficulty in completely delivering the contents of the call due to the sound generated from the TV.

However, the TV of the electronic device according to an embodiment of the present disclosure may have the artificial intelligence speaker embedded therein, and control the driving of the TV such as reducing the volume of the TV of the electronic device by determining that the user makes a phone call through the embedded artificial intelligence speaker.

In general, since it is determined that the volume of the TV is noise when the user makes a call, as described above, a configuration in which it is determined that the sound generated from the TV is noise to control the volume of the TV when the user makes a call may largely reduce the probability of the voice command misrecognition of the user.

Hereinafter, an embodiment of controlling the driving of the electronic device that generates noise will be described with reference to the drawings.

Figure 3:
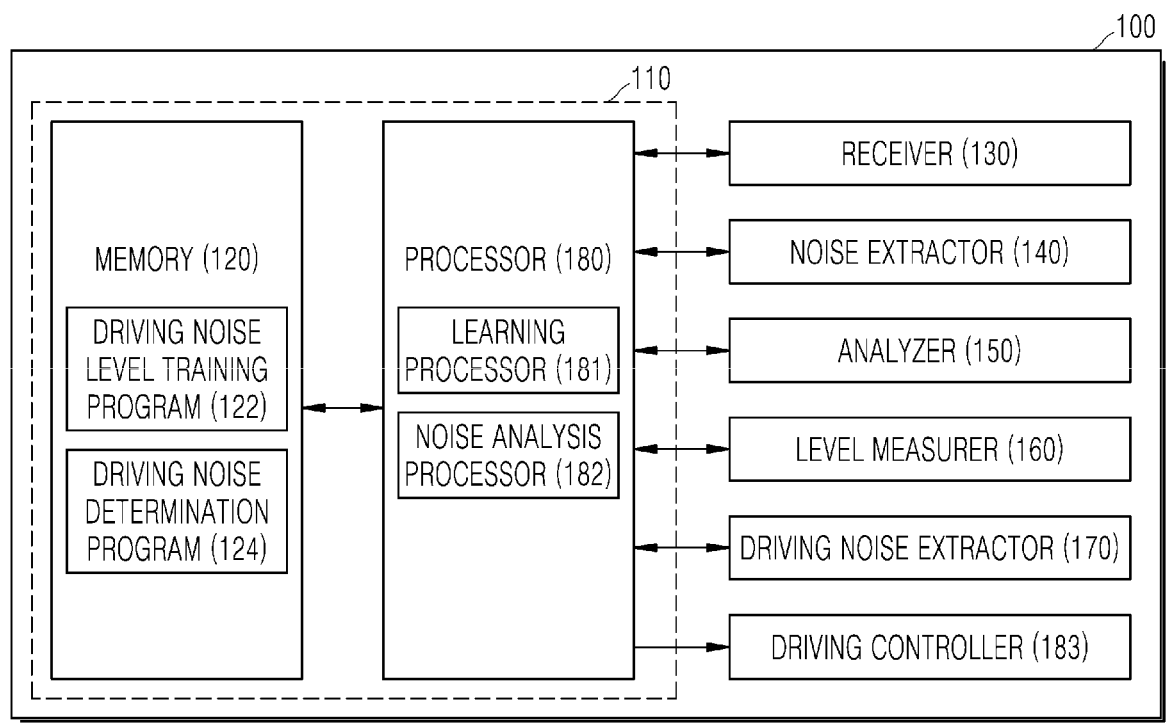
FIG. 3 is a block diagram schematically showing a noise manageable electronic device according to an embodiment of the present disclosure.
Figure 4:
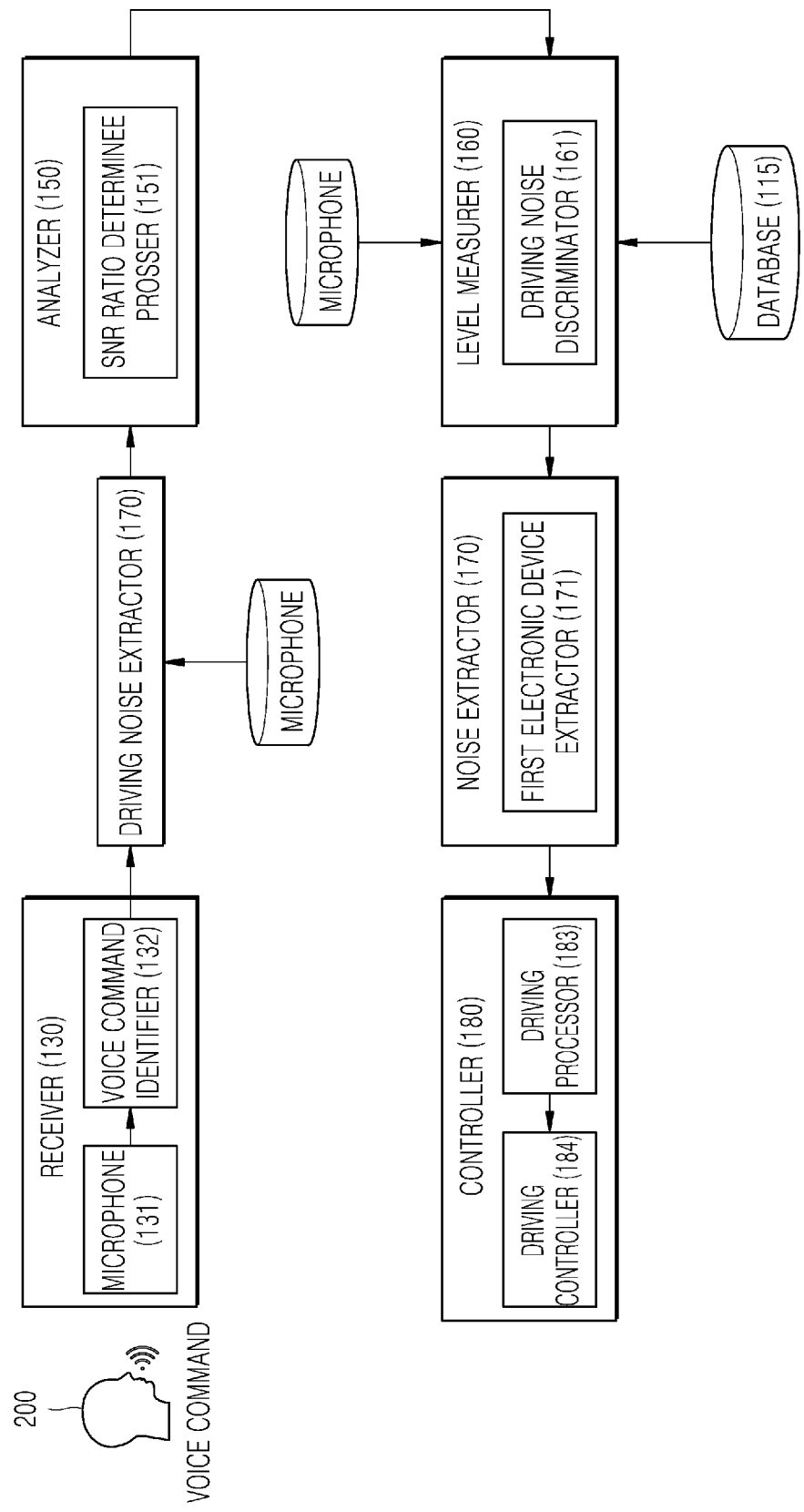
FIG. 4 is a block diagram specifically showing a configuration of a noise manageable electronic device in FIG. 3.

FIG. 3 is a block diagram schematically showing a noise manageable electronic device according to an embodiment of the present disclosure, and FIG. 4 is a block diagram specifically showing a configuration of a noise manageable electronic device in FIG. 3. In the following description, the description of parts overlapping with the description of FIGS. 1 and 2 will be omitted.

According to an embodiment of the present disclosure, the noise manageable electronic device 100 (see FIG. 1) may be configured to include a receiver 130, a noise extractor 140, and a processor 180.

The receiver 130 may receive the voice command of the user and the noise generated from the plurality of electronic devices 100 arranged in the home. To this end, the receiver 130 may be composed of an artificial intelligence speaker, a microphone 121, and the like. The voice command of the user received by the microphone 121 should confirm whether the voice command is correct. To this end, the receiver 130 may further include a voice command identifier 132 that may confirm the voice command that the user has uttered "noisy." The voice command of the user and the noise generated from the plurality of electronic devices 100 may be collected through the receiver 130 mounted on the electronic device, but collected through a separate artificial intelligence (AI) speaker, and then also received through a receiver (not shown) of the noise manageable electronic device.

Here, the voice command is described as an example in which the user 200 utters a voice but alternatively, may also be a command generated by touching a button, a display, or the like disposed on the electronic device.

The noise extractor 140 may extract the noise generated from the plurality of electronic devices arranged in the home. Specifically, the noise extractor 140 may separate only the driving noise of the electronic device, for example, when the user's voice and the driving noise of the electronic device are simultaneously uttered.

That is, the receiver 130 may receive both the voice command uttered by the user and the noise generated from the plurality of electronic devices 100 arranged in the home. When the sound is received, it is separated into the voice command and the noise through the noise extractor 140.

When the received sound is separated into the voice command and the noise, the processor 180 may determine whether the received voice command is recognizable. At this time, when it is determined that the voice command is recognizable, the processor 180 may reduce the noise by controlling the driving of a first electronic device 100a that has generated the noise among the plurality of electronic devices.

Otherwise, when it is determined that the voice command is not recognizable, the processor 180 may determine the ratio between the voice command and the noise based on the signal-to-noise ratio (SNR). That is, as the ratio of the noise to the voice command in the signal-to-noise ratio is smaller, it is determined that the voice command recognition is possible.

The signal-to-noise ratio (SNR) means a value obtained by dividing the intensity of the signal having information by the intensity of the noise. Specifically, it numerically expresses the amount of noise components accompanying the signal, and indicates the ratio of the signal (SIGNAL, S) and the noise (NOISES, N). A unit of the signal-to-noise ratio is dB and as the numerical value is larger, the noise is smaller.

To this end, the processor 180 may further include an analyzer 150 including a SNR ratio determinee prosser 151 capable of determining the ratio between the voice command and the noise based on the signal-to-noise ratio (SNR), and analyzing the determined ratio between the voice command and the noise.

Specifically, the analyzer 150 may analyze at least any one among wind noise, vibration noise, suction noise, and sound noise generated when the plurality of electronic devices are operated so that voice command recognition is not possible.

For example, the wind noise may generate when an electronic device such as an air conditioner or an air purifier is driven, and the operating vibration noise may generate when an electronic device such as a washer or a dryer is driven. In addition, the wind noise may generate together with the suction noise when a cleaner such as a robot cleaner or a wireless cleaner operates. In addition, in the case of a TV or an artificial intelligence (AI) speaker, the sound noise may generate, and the noise is analyzed by the analyzer 150.

In addition, the analyzer 150 may determine that the voice command recognition is impossible as the ratio of the noise to the voice command in the signal-to-noise ratio is larger. As described above, the signal-to-noise ratio numerically expresses the amount of the noise components accompanying the signal, and indicates the ratio of the signal (SIGNAL, S) and the noise (NOISES, N), and this means that since the noise is smaller as the numerical value is larger, the noise ratio is larger, the recognition of the voice command is impossible.

As described above, when the noise ratio is large in the signal-to-noise ratio, the analyzer 150 determines that the noise has generated. In order to recognize the voice command, it is necessary to determine the electronic device that has generated the noise, and to this end, the user 200 may recognize the noise having generated from the electronic device arranged in the home flowing into a microphone, a camera, or the like mounted on the electronic device 100c (see FIG. 5) close to the position where the user 200 has generated the voice command, and determine the electronic device generating the largest level (dB) among the recognized noises as a first electronic device 100a that generates the noise.

To this end, the processor 180 may include a level measurer 160 configured to measure the level (dB) of the driving noise generated from the plurality of electronic devices 100 through at least any one among a microphone, a camera, or the like arranged in the home, and a driving noise extractor 170 configured to extract the largest driving noise level among the driving noises generated from the plurality of electronic devices 100.

As described above, the driving noise (for example, vibration noise, wind noise, sound noise, or the like) may generate when the electronic device is driven. At this time, the type of the driving noise in each electronic device may be determined through a driving noise discriminator 161 of the level measurer 160, and the largest driving noise may be extracted among the determined driving noises. Here, the driving noise discrimination may be made based on a database 115 in which driving noise information generated in each electronic device has been stored.

Here, the level measurer 160 measures at least any one noise level among wind noise, vibration noise, suction noise, and sound noise generated when the plurality of electronic devices operate.

As described above, when the type and level of noise generated from the electronic device are measured, the largest driving noise may be extracted among the level of the noise measured by the driving noise extractor 170. The extracted largest noise may be reference data for extracting a first electronic device 100*c* (see FIG. 5) that generates the noise by a first electronic device extractor 171.

When determining the first electronic device, the driving of the first electronic device may be controlled through the driving processor 180 to block the source of the noise. Specifically, the source of the noise may be blocked by controlling the motor of the first electronic device to temporarily stop the corresponding electronic device, or through a control of reducing the volume of the first electronic device, or the like.

At this time, the driving noise information of the plurality of electronic devices may be stored in the memory 120 in order to control the driving of the first electronic device that is determined that the noise generates.

Specifically, the memory 120 may store a learning data set labeled with driving noise generated for each driving operation in which the plurality of electronic devices are driven. For example, the level (dB) for the volume of the TV, the level (dB) of the wind noise generated according to the setting temperature at operation of the air conditioner, and the like may be labeled and stored.

When the plurality of electronic devices are driven based on the thus stored learning data set, the noise generated from each of the electronic devices generated during driving may be trained through a training program 122 for each operation. For example, from the lowest volume of the TV to the highest volume may be trained, and the wind noise generated at operation of the air conditioner is trained for each operation according to the setting temperature.

As described above, the machine learning model generated by the training may be stored in the memory 120 as the driving noise determination program 124 of the plurality of electronic devices. Based on the stored driving noise determination program 124 of the electronic device, the magnitude of noise generated from the electronic device may be determined.

In addition, the memory 120 records various information necessary for controlling the electronic device through the noise controllable electronic device, and may include a volatile or nonvolatile recording medium. The recording medium stores data that may be read by the processor 180, and may include a hard disk drive (HDD), a solid state disk (SSD), a silicon disk drive (SDD), a ROM, a RAM, a CD-ROM, a magnetic tape, a floppy disk, an optical data storage device, and the like. In the present embodiment, the information stored in the memory 120 will be described for each situation according to the context.

As described above, when the noise information of the electronic device is stored in the memory 120, learning about the noise of the electronic device may be performed through a learner (not shown) based on the stored noise information.

Meanwhile, the learning may be performed in the electronic device itself, but also performed outside rather than in the electronic device, and only noise information derived as a learning result may be also delivered to and stored in the electronic device.

In an embodiment of the present disclosure, the information on the noise information of the electronic device stored in the memory 120 will be described as an example provided from an external server (not shown). Such a server may be a database server configured to provide big data necessary for applying various artificial intelligence algorithms and data relevant to the voice recognition. In addition, the server may also include a web server or an application that may remotely control the electronic device through a transceiver (not shown) configured to communicate with an application or a web browser installed on the electronic device.

That is, the first electronic device 100*a* that generates noise in the home may be extracted based on the noise information of the plurality of electronic devices stored in the server 300, the magnitude information of the noise that may generate in each electronic device, and the like.

At this time, the server 300 may confirm on/off of the electronic device through the electronic device information linked with the plurality of electronic devices. Accordingly, the first electronic device 100*a* that has generated the noise is extracted based on the information of the electronic device in the on state.

Meanwhile, the electronic device according to an embodiment of the present disclosure may include one or more processors, and the memory may be connected with one or more processors.

At this time, when executed by one or more processors 180, the memory 120 may store a command causing so that the processor 180 receives a voice command from a user and a sound signal including noise generated from the plurality of electronic devices arranged in the home, extracts noise from the sound signal, determines whether the received voice command is recognizable, and reduces the noise by controlling the driving of the first electronic device having generated the noise among the plurality of electronic devices when it is determined that the voice command is not recognizable.

That is, a command for driving the receiver 130, the noise extractor 140, the level measurer 160, the driving noise extractor 170, the analyzer 150, and the like described above may be driven by one processor, but alternatively, may be driven by the plurality of processors coupled with each configuration.

Meanwhile, the processor 180 may further include a learning processor 181 so as to train a machine learning model in the memory 120, a noise analysis processor 182 configured to analyze noise based on the driving noise determination program of the plurality of electronic devices stored in the memory 120, a driving processor 180 capable of driving the first electronic device analyzed in the noise analysis processor 182 to have the largest noise, and the like.

Specifically, the processor 180 may temporarily stop the corresponding electronic device by controlling the motor of the first electronic device, or block the source of the noise through the control such as reducing the volume of the first electronic device.

As described above, the processor 180 including the driving processor 180 configured to control the driving of the first electronic device extracted as the source of the noise may include all types of devices capable of processing data. Here, 'the processor' may, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited.

As a result, the voice command generated from the user and the noise generated from the plurality of electronic devices are collected, and the noise generated from the plurality of electronic devices is separated from the collected sound.

When the noise is separated from the collected sound, it may be determined whether the voice command is recognizable. That is, it is determined whether the driving of the first electronic device that has generated the noise may be controlled by the voice command.

At this time, it may be determined whether the voice command is recognizable through the ratio between the voice command and the noise based on the signal-to-noise ratio. That is, as the rate of the noise is smaller in the ratio between the voice command and the noise, it may be determined that the voice command recognition is possible.

When it is determined that the voice command is impossible, the first electronic device 100a that has generated the noise may be determined. For example, the electronic device having the largest driving noise among the electronic devices in operation may be determined as the first electronic device 100a that has generated the noise.

When the first electronic device 100a is determined, it is possible to control the motor of the first electronic device 100a or to stop the driving thereof, thereby minimizing the generation of the noise. As a result, it is possible to recognize the voice command generated by the user 200.

Figure 5:
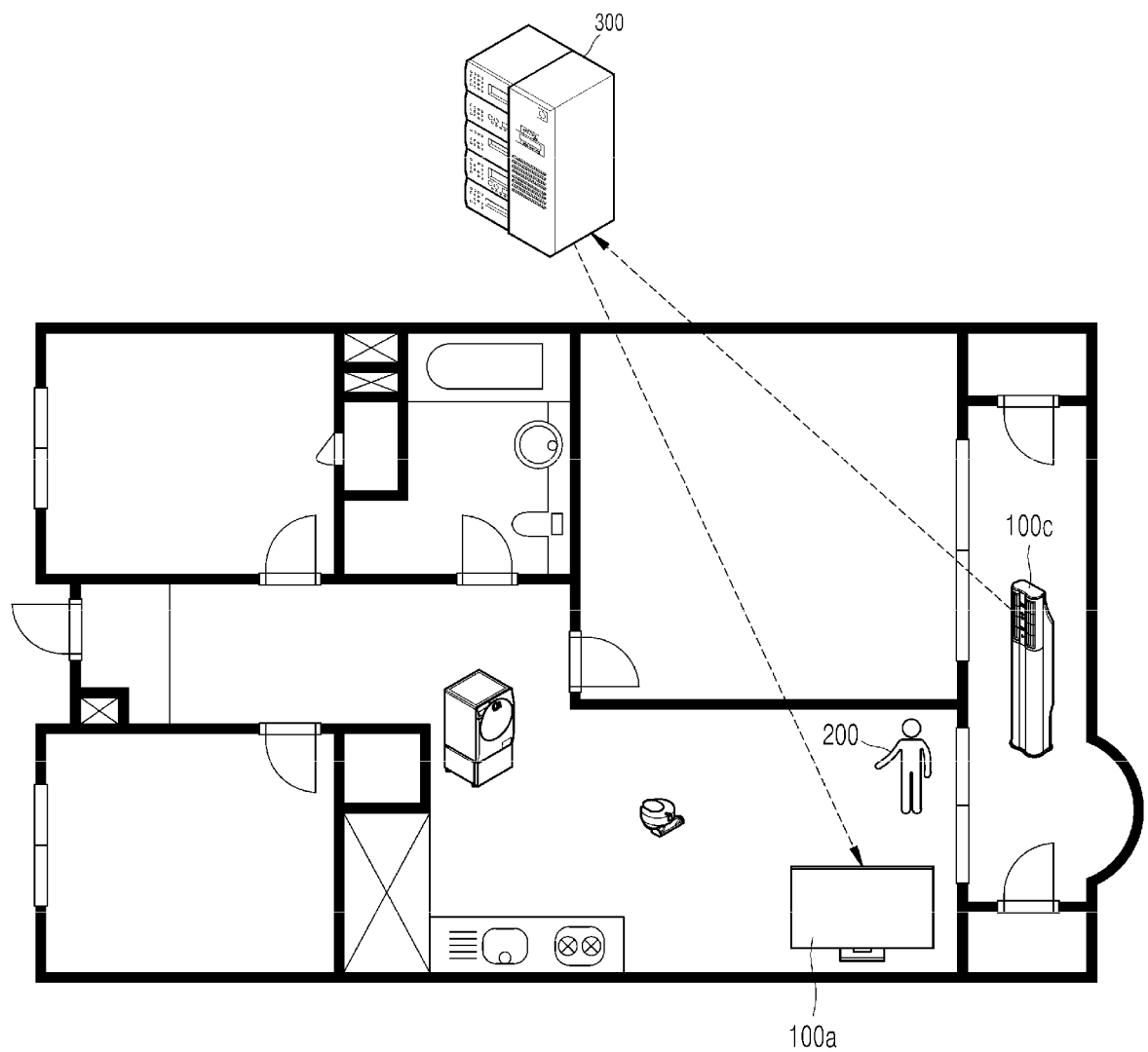
FIG. 5 is a diagram showing an embodiment of controlling the driving of an electronic device through a noise manageable electronic device according to an embodiment of the present disclosure.

FIG. 5 is a diagram showing an embodiment of controlling the driving of an electronic device through a noise manageable electronic device according to an embodiment of the present disclosure. In the following description, the description of parts overlapping with the description of FIGS. 1 to 4 will be omitted.

Referring to the drawing, a plurality of electronic devices (for example, a TV, an air conditioner, a washer, a robot cleaner, and the like 100 (see FIG. 1)) may be arranged in a home. At this time, the user 200 (see FIG. 1) may generate a voice command of "noisy" or "reduce the sound" for making a call or due to other reasons. The receiver 130 may receive the generated voice command, and the noise generated from the plurality of electronic devices arranged in the home.

Thereafter, the noise extractor 140 may extract the noise from the sound mixed with the noise and the voice command received by the receiver 130, and determine whether the extracted voice command is recognizable. At this time, when it is determined that the voice command is recognizable, the noise may be reduced by controlling the driving of the first electronic device 100a that has generated the noise among the plurality of electronic devices.

Otherwise, when it is determined that the voice command is not recognizable, the processor 180 may determine the ratio between the voice command and the noise based on the signal-to-noise ratio (SNR). That is, as the ratio of the noise to the voice command in the signal-to-noise ratio is smaller, it is determined that the voice command recognition is possible.

When it is determined that the voice command is impossible, the first electronic device 100a that has generated the noise may be determined. Specifically, the electronic device having the largest driving noise among the electronic devices in operation may be determined as the first electronic device 100a that has generated the noise.

When the first electronic device 100a is determined, the motor of the first electronic device 100a is controlled or the driving thereof is stopped, thereby minimizing the generation of the noise.

For example, when it is determined that the first electronic device having the highest noise level among the collected driving noises of the home appliance is a TV, the electronic device that generates the noise may be blocked by lowering the volume of the TV or turning off the TV.

Meanwhile, when the first electronic device is determined, it is not possible to determine the electronic device that generates the driving noise having the largest level.

In this case, the driving of the electronic device that is the closest to the user and driven may be controlled. This is because the noise generated by the electronic device closest to the user (for example, the air conditioner 100c in FIG. 5) may be the electronic device that generates the noise that provides the largest noise to the user.

In addition, when the first electronic device is determined, the driving of any one electronic device among the electronic devices in operation may be controlled if the electronic device that generates the driving noise having the highest level is not determined. That is, when it is not possible to determine the electronic device that is the source of the noise, it is determined whether the "noisy state" sensed by the user is maintained by controlling any one electronic device of the plurality of electronic devices. As described above, when any one electronic device of the plurality of electronic devices is controlled to maintain the "noisy state" sensed by the user, the electronic device that generates the noise is extracted in a method of continuously controlling any one electronic device among the plurality of electronic devices.

In addition, when it is not possible to determine the electronic device that generates the driving noise having the largest level, the driving of the entire electronic device in operation may also be controlled (for example, the power is turned off) to control the cause of generating the noise.

Figure 6:
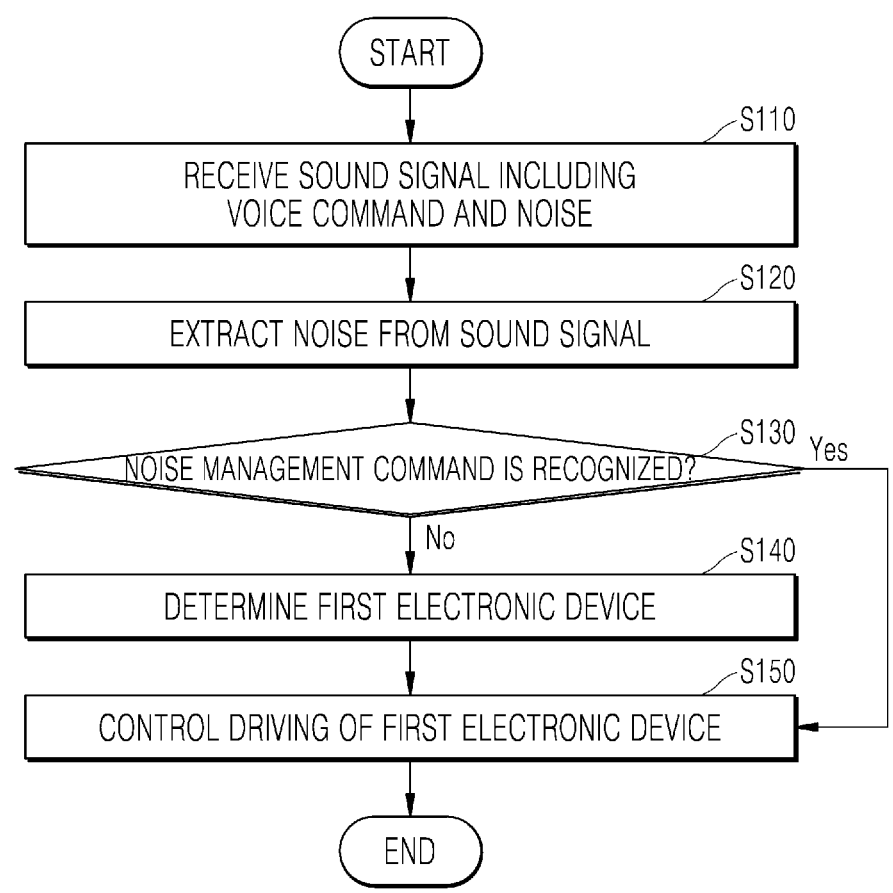
FIG. 6 is a flowchart showing a process of controlling the driving of an electronic device through a noise manageable electronic device according to an embodiment of the present disclosure.
Figure 7:
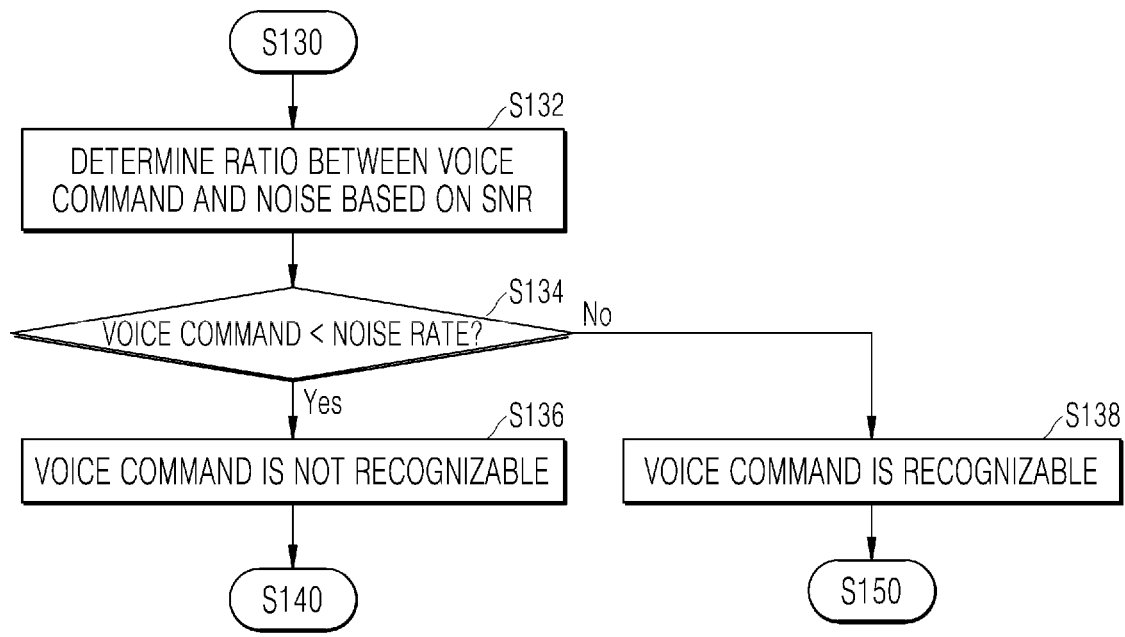
FIG. 7 is a flowchart specifically showing a process of recognizing a voice command generated from the user in FIG. 6.
Figure 8:
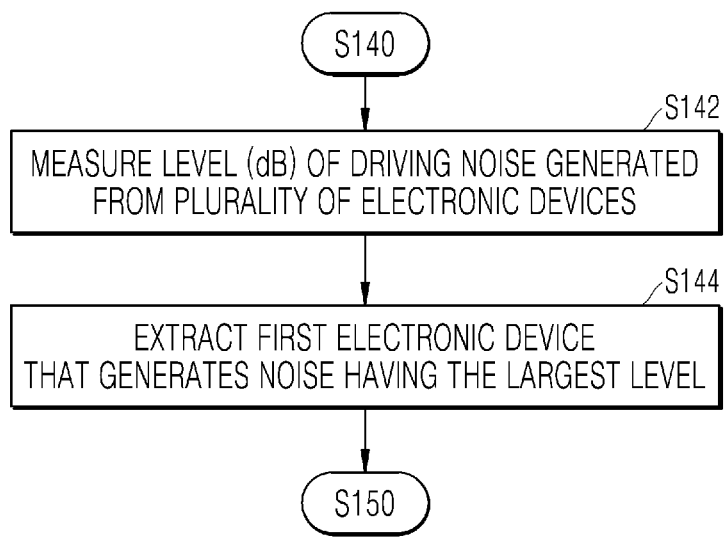
FIG. 8 is a flowchart specifically showing a process of determining a first electronic device that has generated noise in FIG. 6.
Figure 9:
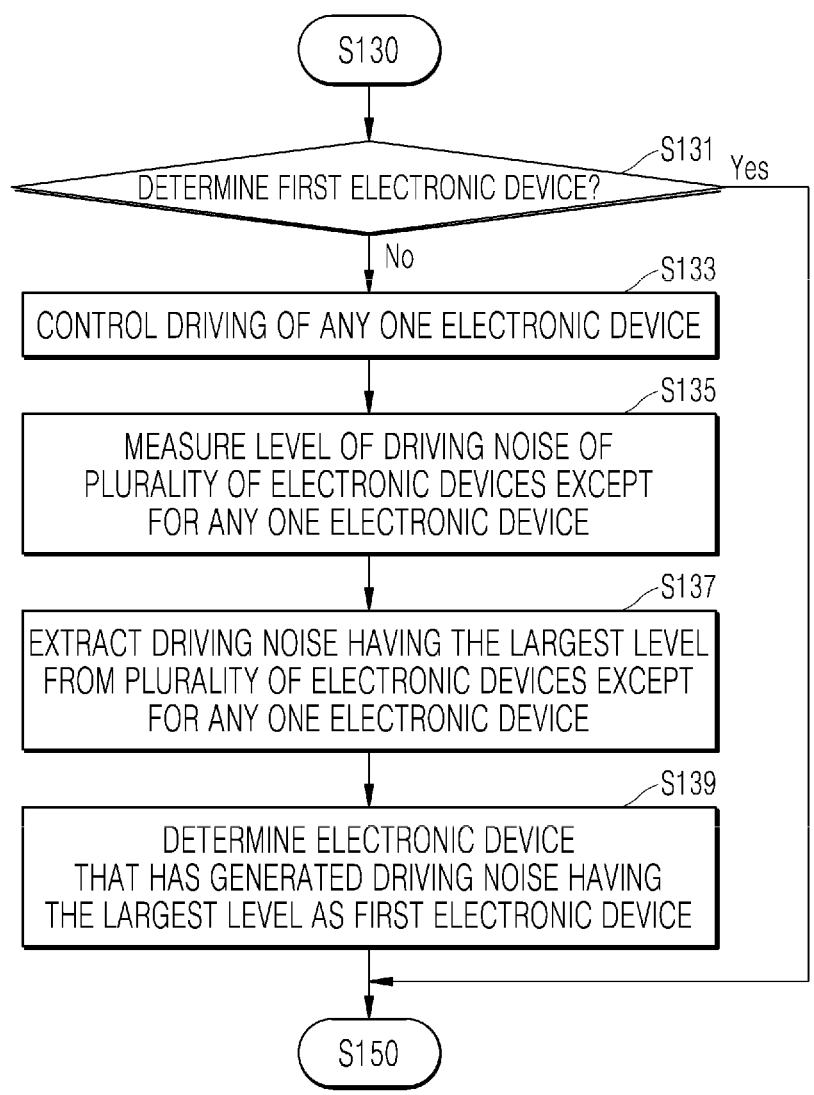
FIG. 9 is a flowchart showing a process according to another embodiment the determination and driving control of a first electronic device that has generated noise in FIG. 6.

FIG. 6 is a flowchart showing a process of controlling the driving of an electronic device through a noise manageable electronic device according to an embodiment of the present disclosure, FIG. 7 is a flowchart specifically showing a process of recognizing a voice command generated from the user in FIG. 6, FIG. 8 is a flowchart specifically showing a process of determining a first electronic device that has generated noise in FIG. 6, and FIG. 9 is a flowchart showing a process according to another embodiment the determination and driving control of a first electronic device that has generated noise in FIG. 6. In the following description, the description of parts overlapping with the description of FIGS. 1 to 5 will be omitted.

The electronic device according to an embodiment of the present disclosure includes a noise manageable electronic device capable of controlling the driving of an electronic device that generates noise when the user has generated a voice command.

Noise, such as driving vibration or sound noise may generate while the electronic device is driven. At this time, the driving of the electronic device may be controlled to reduce the noise generated from the electronic device according to the user's command.

Specifically, describing a process of controlling the operation of the electronic device by using the noise manageable electronic device, first, the user may receive a noise management command such as "noisy" or "reduce the sound" and the plurality of electronic devices 100 (see FIG. 1) (operation S110).

Thereafter, only the noise may be separated from the sound in which the noise and the voice command are mixed (operation S120). When the received sound is separated into the voice command and the noise, it is possible to determine whether the received voice command is recognizable (operation S130).

At this time, when it is determined that the voice command is recognizable, the driving of the first electronic device 100a that has generated the noise among the plurality of electronic devices is controlled to reduce the noise (operation S150).

Otherwise, when it is determined that the voice command is not recognizable, the processor 180 may determine the ratio between the voice command and the noise based on the signal-to-noise ratio (SNR). That is, as the ratio of the noise to the voice command is smaller in the signal-to-noise ratio, it is determined that the voice command recognition is possible (operations S130, S132).

The signal-to-noise ratio (SNR) means a value obtained by dividing the intensity of the signal having information by the intensity of the noise. That is, the ratio between the voice command and the noise based on the signal-to-noise ratio (SNR) may be determined, and the determined ratio between the voice command and the noise may be analyzed (operation S134).

At this time, when the rate of the noise is smaller than the voice command, it is determined that the voice command is recognizable, thereby controlling the driving of the first electronic device 100a that has generated the noise (operations S138, S150).

On the contrary, when the rate of the noise is larger than the voice command, it is determined that the voice command is not recognizable, and the first electronic device 100a is determined (operations S136, S140).

Specifically, the level (dB) of the driving noise generated from the plurality of electronic devices 100 is measured through at least any one of a microphone and a camera arranged in the home, and the electronic device that has generated the driving noise having the largest level among the driving noises generated from the plurality of electronic devices 100 is extracted (operations S142, S144). As described above, the electronic device having the largest driving noise level may be determined as the first electronic device 100a that has generated the largest noise.

Thereafter, the motor of the determined first electronic device 100a is controlled or the driving thereof is stopped, thereby minimizing the generation of the noise (operation S150).

Meanwhile, when the first electronic device is determined, it is not possible to determine the electronic device that generates the driving noise having the largest level (operation S131). The driving of any one electronic device among the electronic devices in operation may be controlled (operation S133).

That is, when it is not possible to determine the electronic device that is the source of the noise through a microphone, an artificial intelligence speaker, or the like mounted on the electronic device adjacent to the user, any one electronic device among the plurality of electronic devices is controlled to determine whether the "noisy state" sensed by the user is maintained.

For example, when it is not possible to determine the electronic device that is the source of the noise, it is possible to control the driving of the air conditioner in the entire electronic device. Thereafter, the driving noise level of the remaining plurality of electronic devices are measured, and then the driving noise having the largest level is extracted to determine the first electronic device that has generated the noise (operations S135, S137).

At this time, when it is not possible to determine the electronic device that is the source of the noise, the driving of another electronic device except for the air conditioner having driving controlled, and the first electronic device may be determined in a process of determining the first electronic device by measuring the driving noise level of the remaining electronic devices, and then the driving of the determined first electronic device may be controlled (operations S139, S150).

The noise generated from the plurality of electronic devices together with the noise management command of the user thus generated may be collected, then the noise may be separated from the collected sound, and then the ratio of the noise to the noise management command may be analyzed to determine that the noise management command is not recognizable as the rate of the noise is larger. When it is determined that the noise management command is not recognizable, the noise generated from the electronic device arranged in the home flowing into a microphone, a camera, or the like mounted on the electronic device close to the position where the voice command is generated is recognized and the electronic device generating the largest level (dB) among the recognized noises may be determined as the first electronic device that generates the noise. The corresponding electronic device may be temporarily stopped by controlling the motor of the thus determined first electronic device, or the source of the noise may be blocked through a control such as reducing the volume of the first electronic device. Accordingly, it is possible to minimize the inconvenience of the user caused by noise.

Figure 10:
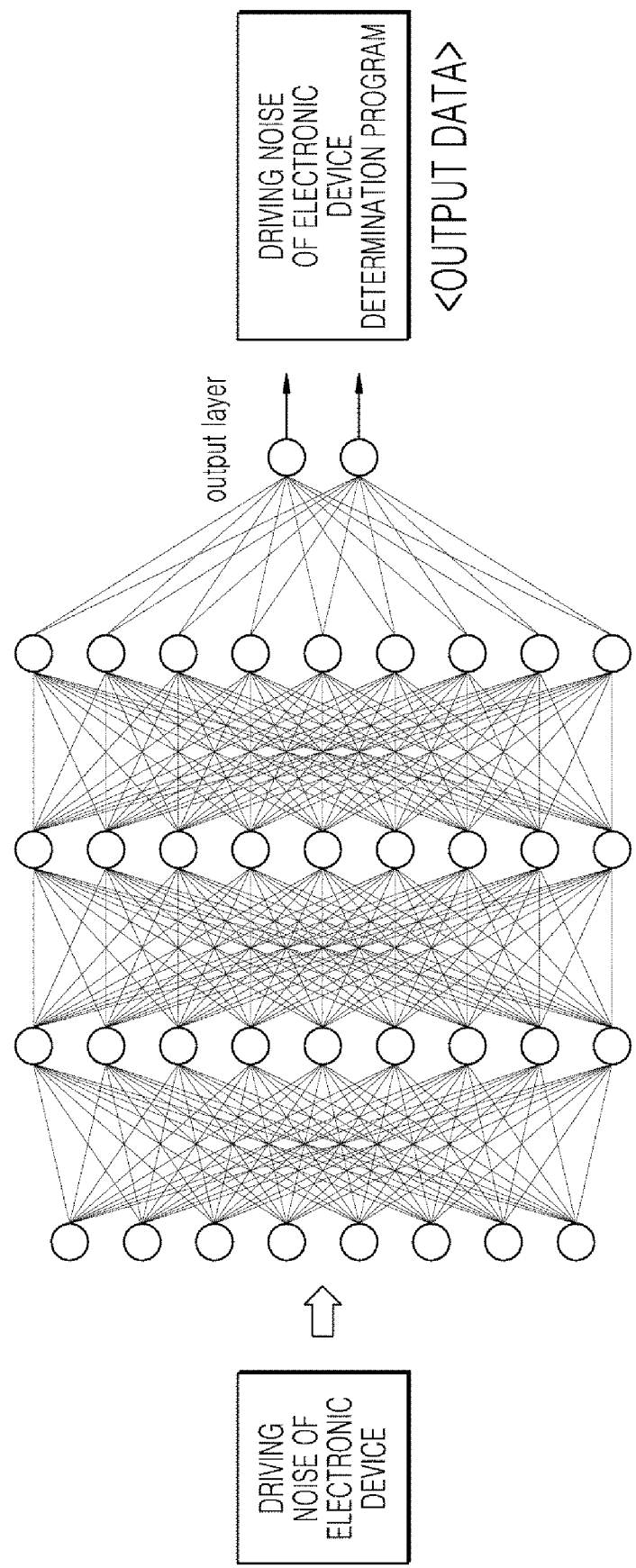
FIG. 10 is a diagram for explaining a deep neural network model for executing an electronic device driving noise determination program according to the driving noise generated from the electronic device according to an embodiment of the present disclosure.

FIG. 10 is a diagram for explaining a deep neural network model for executing an electronic device driving noise determination program according to the driving noise generated from an electronic device according to an embodiment of the present disclosure.

At operation of the electronic device, a deep neural network model previously trained by using machine learning of artificial intelligence may be used to determine whether the sound generated for each driving operation is the electronic device driving noise.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, the Machine Learning may be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include a decision tree, a Bayesian network, a support vector machine (SVM), an artificial neural network (ANN), and so forth. Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

In the meantime, a deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network may be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process. Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Accordingly, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy.

By using the above methods, the estimation of the state of the object to be heated may be further refined.

Various methods may be present in order to generate a deep neural network model for use in an embodiment of the present disclosure, but in the case of supervised learning, the following training process may be performed as a preliminary task.

The processor 180 of the electronic device may sense the sound generated for each driving operation at operation of the plurality of electronic devices 100, and with respect to the above, also constitute a learning data set in which the user labels whether the sound generated from the electronic device is the electronic device driving noise.

By training the deep neural network model with this training data, the trained learning model may then reflect the driving noise feature of the electronic device to determine whether the generating sound is the driving noise of the electronic device when the electronic device is driven.

The user may further refine this learning model by continuously giving feedback with respect to the determination result of the deep neural network model.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. That is, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Accordingly, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of controlling noise, comprising:
   receiving, by a receiver, sound that comprises a voice command from a user and noise generated from at least one of a plurality of electronic devices;
   extracting, out of the received sound by a noise extractor, at least a portion of the noise generated from at least one of the plurality of electronic devices;
   determining, by a processor, whether the received voice command is recognizable relative to the received noise after extraction;
   determining, by the processor, a first electronic device of the plurality of electronic devices that is responsible for at least a portion of the noise based on a determination that the voice command is non-recognizable; and
   reducing the noise by controlling the first electronic device,
   wherein determining, based on (i) the voice command being determined non-recognizable and (ii) an electronic device among the plurality of electronic devices that is responsible for the noise being determined not ascertainable, the first electronic device comprises:
   controlling all of the plurality of electronic devices,
   measuring intensity levels of noises generated from all of the plurality of electronic devices through at least one of a microphone or a camera,
   extracting a noise signal that has a highest intensity level among the measured noises generated from the plurality of electronic devices, and
   identifying an electronic device that generates the extracted noise signal to be the first electronic device responsible for the noise.

2. The method of claim 1, wherein determining the first electronic device comprises:
   determining one of the plurality of electronic devices as the first electronic device based on correspondence of the extracted noise signal to the one of the plurality of electronic devices.

3. The method of claim 1,
   wherein measuring the intensity levels of the noise comprises measuring at least one of wind noise, vibration noise, suction noise, or sound noise generated by the plurality of electronic devices.

4. The method of claim 3,
   wherein determining the first electronic device comprises analyzing the at least one of the wind noise, the vibration noise, the suction noise, or the sound noise generated from the first electronic device based on the voice command being non-recognizable.

5. The method of claim 1, wherein determining whether the received voice command is recognizable comprises:
   determining a ratio of an intensity of the voice command to an intensity of the noise as a signal-to-noise ratio (SNR); and
   analyzing the determined ratio.

6. The method of claim 5, further comprising:
   determining, after analyzing the determined ratio, that the voice command is not recognizable based on the intensity of the noise being larger than the intensity of the voice command.

7. The method of claim 1, further comprising:
   inputting, to a machine learning model, learning data that comprises a learning data set labeled with noises generated from the plurality of electronic devices;
   training the machine learning model based on the input learning data for identifying an electronic device that corresponds to the extracted noise; and
   storing the trained machine learning model as a noise determination program for the plurality of electronic devices.

8. A non-transitory computer program stored in a computer readable recording medium for executing the method of claim 1.

9. An electronic device configured to control noise, comprising:
   at least one processor configured to:
   receive sound that comprises a voice command from a user and noise generated from at least one of a plurality of electronic devices;
   extract, out of the received sound, at least a portion of the noise generated from at least one of the plurality of electronic devices; and
   determine whether the received voice command is recognizable relative to the received noise after extraction; and
   reduce the noise by controlling a first electronic device of the plurality of electronic devices, wherein the first electronic device that is responsible for at least a portion of the noise is determined based on a determination that the voice command is non-recognizable,
   wherein the processor is further configured to, based on (i) the voice command being determined non-recognizable and (ii) an electronic device among the plurality of electronic devices that is responsible for the noise being determined not ascertainable:
   control all of the plurality of electronic devices, measure intensity levels of noises generated from all of the plurality of electronic devices through at least one of a microphone or a camera,
   extract a noise signal that has a highest intensity level among the measured noises generated from the plurality of electronic devices, and
   identify an electronic device that generates the extracted noise signal to be the first electronic device responsible for the noise.

10. The electronic device of claim 9,
    wherein the processor is further configured to:
    determine one of the plurality of electronic devices as the first electronic device based on correspondence of the extracted noise signal to the one of the plurality of electronic devices.

11. The electronic device of claim 9,
    wherein measuring the intensity level of the noise comprises measuring at least one of wind noise, vibration noise, suction noise, or sound noise generated by the plurality of electronic devices.

12. The electronic device of claim 11,
    wherein the processor is further configured to:
    determine a ratio of an intensity of the voice command to an intensity of the noise as a signal-to-noise ratio (SNR), and analyze the determined ratio.

13. The electronic device of claim 12,
    wherein the processor is further configured to determine, after analyzing the determined ratio, that the voice command is not recognizable based on the intensity of the noise being larger than the intensity of the voice command.

14. The electronic device of claim 11, wherein the processor is further configured to:
    analyze the at least one of the wind noise, the vibration noise, the suction noise, or the sound noise generated from the first electronic device, based on the voice command being non-recognizable.

15. The electronic device of claim 9,
    wherein the processor is further configured to:
    input, to a machine learning model, learning data that comprises a learning data set labeled with noises generated from the plurality of electronic devices;
    train the machine learning model based on the input learning data for identifying an electronic device that corresponds to the extracted noise; and
    store the trained machine learning model as a noise determination program for the plurality of electronic devices.

16. A noise manageable electronic device, comprising:
    one or more processors; and
    a memory connected to the processor,
    wherein the one or more processors are configured to execute commands stored in the memory to:
    receive sound that comprises a voice command from a user and noise generated from at least one of a plurality of electronic devices;
    extract at least a portion of the noise generated from at least one of the plurality of electronic devices; and
    determine whether the received voice command is recognizable relative to the received noise after extraction, and reduce the noise by controlling a first electronic device of the at least one of the plurality of electronic devices, wherein the first electronic device is determined based on a determination that the voice command is non-recognizable,
    wherein the one or more processors are further configured to, based on (i) the voice command being determined non-recognizable and (ii) an electronic device among the plurality of electronic devices that is responsible for the noise being determined not ascertainable, execute commands stored in the memory to:

control all of the plurality of electronic devices, measure intensity levels of noises generated from all of the plurality of electronic devices through at least one of a microphone or a camera, extract a noise signal that has a highest intensity level among the measured noises generated from the plurality of electronic devices, and identify an electronic device that generates the extracted noise signal to be the first electronic device responsible for the noise.

\* \* \* \* \*